United States Patent
Groothues et al.

(10) Patent No.: US 10,466,406 B2
(45) Date of Patent: Nov. 5, 2019

(54) LIGHT GUIDE PLATE AND METHOD FOR THE PRODUCTION THEREOF

(71) Applicants: Herbert Groothues, Frankfurt (DE); Jann Schmidt, Weiterstadt (DE); Wangelis Karampougioukis, Darmstadt (DE); Stephan Neumayer, Frankfurt (DE); Helmut Haering, Otzberg (DE); Berthold Schoenig, Rossdorf (DE)

(72) Inventors: Herbert Groothues, Frankfurt (DE); Jann Schmidt, Weiterstadt (DE); Wangelis Karampougioukis, Darmstadt (DE); Stephan Neumayer, Frankfurt (DE); Helmut Haering, Otzberg (DE); Berthold Schoenig, Rossdorf (DE)

(73) Assignee: EVONIK ROEHM GmbH, Darmstadt (DE)

( * ) Notice: Subject to any disclaimer, the term of this patent is extended or adjusted under 35 U.S.C. 154(b) by 735 days.

(21) Appl. No.: 14/906,961

(22) PCT Filed: Jul. 3, 2014

(86) PCT No.: PCT/EP2014/064212
§ 371 (c)(1),
(2) Date: Jan. 22, 2016

(87) PCT Pub. No.: WO2015/010871
PCT Pub. Date: Jan. 29, 2015

(65) Prior Publication Data
US 2016/0170128 A1    Jun. 16, 2016

(30) Foreign Application Priority Data

Jul. 22, 2013 (DE) .................. 10 2013 214 257

(51) Int. Cl.
*F21V 8/00* (2006.01)

(52) U.S. Cl.
CPC ......... *G02B 6/0055* (2013.01); *G02B 6/0043* (2013.01); *G02B 6/0061* (2013.01); *G02B 6/0065* (2013.01)

(58) Field of Classification Search
CPC .... G02B 6/0055; G02B 6/043; G02B 6/0061; G02B 6/0065
(Continued)

(56) References Cited

U.S. PATENT DOCUMENTS

2007/0242184 A1   10/2007   Ohta et al.
2010/0157623 A1   6/2010    Tanahashi
(Continued)

FOREIGN PATENT DOCUMENTS

CN          102519009 A       6/2012
DE   10 2009 027 288 A1      12/2010
(Continued)

OTHER PUBLICATIONS

International Preliminary Report on Patentability dated Jul. 3, 2014 in PCT/EP2014/064212 (English Translation only).
(Continued)

*Primary Examiner* — Anh T Mai
*Assistant Examiner* — Jessica M Apenteng
(74) *Attorney, Agent, or Firm* — Oblon, McClelland, Maier & Neustadt, L.L.P.

(57) ABSTRACT

A process for producing a light guide plate includes producing a colorless transparent sheet from a colorless transparent material by extrusion with a polishing stack. A printed reflector film is laminated in-line to the colorless transparent sheet. The printed reflector film includes: a thermoplastic reflector film which is opaque white or translucent white and made of a thermoplastic material; and a colorless thermo- (Continued)

plastic printed on the thermoplastic reflector film. There is no direct optical contact between the colorless transparent sheet and the thermoplastic reflector film. A glass transition temperature of the printed colorless thermoplastic is above 25° C. and below glass transition temperatures of the colorless transparent material of the colorless transparent sheet and of the thermoplastic material of the thermoplastic reflector film.

14 Claims, 2 Drawing Sheets

(58) Field of Classification Search
USPC .......................................................... 362/624
See application file for complete search history.

(56) References Cited

U.S. PATENT DOCUMENTS

2011/0244187 A1    10/2011    Rinko
2012/0067512 A1    3/2012     Schmidt et al.
2012/0147627 A1    6/2012     Pan

FOREIGN PATENT DOCUMENTS

| EP | 0 496 323 A2 | 7/1992 |
| EP | 1 845 407 A2 | 10/2007 |
| EP | 2 199 839 A1 | 6/2010 |

OTHER PUBLICATIONS

Examination Report dated Jan. 28, 2016 in PCT/EP2014/064212 (without English Translation).
U.S. Appl. No. 14/240,138, filed Feb. 21, 2014, US-2014-0232027-A1, Wojciech Pisula et al.
U.S. Appl. No. 13/993,882, filed Aug. 8, 2013, US-2013-0343088-A1, Markus Parusel et al.
U.S. Appl. No. 13/030,315, filed Feb. 18, 2011, US-2012-0051696-A2, Jann Schmidt et al.
International Search Report dated Oct. 10, 2014 in PCT/EP14/064212 Filed Jul. 3, 2014.

LIGHT GUIDE PLATE AND METHOD FOR THE PRODUCTION THEREOF

FIELD OF THE INVENTION

Light guide plates, e.g. in backlight units (BLUs) or in light panels, have maximum uniformity of thickness and are composed of colourless transparent materials. Light is input here by way of example from LED or CCFL light sources by way of one or more edges of the light guide plate. On at least one surface of the light guide plate there is a structure which scatters the light. When a light beam is incident on the said structure, it is scattered at an angle smaller than the angle of total reflection, and is thus emitted from the plate. The light is emitted at both sides of the plate, and on one side there is therefore mostly a white reflector film which is not in optical contact with the plate. With this structure, the light is emitted only on one of the sides. The density of the light-emitting structure generally increases with increasing distance from the light sources. The light input at the edge(s) is thus in turn emitted uniformly across the surfaces of the light guide.

PRIOR ART

For the application of the emitting structure there are various technical methods which are used either off-line on plates that have been cut to size or in-line during a continuous process for producing the plates. Among the off-line methods are inter alia flat-bed screen printing of a white, translucent or opaque coating material, laser engraving or a mechanical operation using a CNC milling cutter. The in-line methods use by way of example a structured roll in a polishing stack of a sheet extruder to emboss the structures. The off-line methods have the particular disadvantage of being slow and expensive because of the large amount of work involved. Furthermore, the handling of the light guide plates during the printing process increases the risk of scratch damage to the surface and therefore of an increased reject rate. In-line structuring by an appropriately structured roll in the polishing stack requires relatively high capital expenditure for the structuring of the roll. The metal of which the structured roll surface is composed is also generally markedly softer than a standard chromed polishing roll, since it has to be a material that is more susceptible to mechanical operations. Operating times for these structured rolls are therefore markedly shorter than for normal polishing rolls because of, for example, damage or wear. The surface of structured rolls is moreover more delicate. Another disadvantage is low flexibility relating to the structure in the in-line embossing process.

The embossment structure must be individually adapted to be appropriate to each light panel design in order to achieve uniform light emission. A change of the structure in an in-line embossing process can be achieved only by replacing the structuring roll. This requires that the entire extrusion process be stopped. This type of change takes a number of hours and has high attendant costs. Another disadvantage of the in-line embossing process is the restriction of the repeat of a structure to the circumference of a polishing roll. Provision of a structural density gradient is therefore practicable with this method only perpendicularly to the direction of extrusion, since the circumference of a polishing roll cannot be adapted to make it appropriate for a particular light panel format or BLU format.

DE 102009027288A1 discloses a structure for the emission of the light from a light guide plate which is initially printed onto a transparent film. This film is then laminated to a colourless transparent sheet in the polishing nip of the polishing stack of an extruder. The advantages are that the structures can be printed very easily onto a film, and that the film protects the structure from mechanical damage. However, the film also functions as light guide, and itself requires protection from mechanical damage by at least one further layer. Furthermore, the light transmittance of colourless transparent films is generally poorer than that of light guide plates. The latter can be produced from PMMA, which has high optical transparency. Colourless transparent PMMA is too brittle for thin films. It is therefore necessary either to use impact modifiers, which are somewhat disadvantageous in relation to the light-guide function, or to use a polymer which has lower transparency, e.g. PET or polycarbonate. In both cases the light-guide function is compromised in comparison with an unmodified PMMA. An additional reflector film is also required.

According to DE 69914089, it is also possible to use an adhesive for full lamination of a reflector film onto a light guide plate. The entire reflector film is in optical contact with the light guide plate. In order to achieve approximately uniform light emission, there must be individual strips adhesive-bonded onto the light guide plate with strip width that increases with increasing distance from the light source. This method cannot achieve the fine structure of a printed pattern on a film, and light emission is therefore slightly non-uniform. Furthermore, it is very difficult to achieve exact lamination of strips of this type onto the surface in an in-line process. Another disadvantage of the said invention is that, notwithstanding the above, an additional reflector film is required behind the adhesive-bonded strips.

KR 20-2009-004295 describes a reflector film which has a light guide structure applied by printing. However, the structure applied by printing is composed either of two separate layers, where one layer comprises an adhesive and the other layer comprises a diffuse layer, or of a mixture of adhesive and diffuser. The adhesive moreover requires what is known as a "release liner", a film which protects the adhesive layer and has to be removed prior to the lamination process. The production process is therefore encumbered by additional operations. Furthermore, the adhesive, which generally comprises a pressure-sensitive adhesive, has the disadvantage that adhesion loss can occur after a prolonged service time.

Light guide plates according to the prior art generally emit light with an intensity maximum at an angle greater than 60° (measured with respect to the normal to the surface of the light guide plate). A feature common to almost all of the systems described, with the aim of achieving maximum uniformity of intensity distribution over 0° to 60° is additional use of a scattering film or scattering sheet on the emission side, in particular for use in illumination systems with lateral LED light input. There is no optical contact here between the said additional film or sheet and the light guide plate. A requirement here, in order to obtain a particularly uniform light image, is that the said scattering sheet or scattering film comprises a high proportion of scattering particles. However, this has the disadvantage of causing retroreflection and scattering into the scattering film or scattering sheet. Systems of the prior art therefore require optimization in relation to light yield.

Object

In the light of the prior art, it was therefore an object of the present invention to provide a novel light guide plate which can serve for the emission of light and which is suitable for emitting light uniformly and in high yield across the entire emission area.

Another object of the invention was that the said light guide plate is to have a long service time and to be amenable to low-cost production.

Another object was that the interruptive sites applied by printing in order to scatter or deflect light are protected in such a way as to prevent damage thereto.

The light guide plates of the invention are moreover intended to be amenable to use in light panels or in backlight units of LCD displays.

Another object was to increase the light yield for use of a scattering sheet or scattering film on the emission side of the light guide plate. A particular object here was that the light be emitted with uniform intensity distribution between 0 and 60°, while the necessary amount of scattering particles in the said scattering sheet or scattering film is markedly smaller than in the prior art.

An object of the present invention was at the same time to provide a process for the production of light guide plates of this type which can be carried out more easily, less expensively and, as far as is possible, more rapidly than the processes known according to the prior art for the production of light guide plates.

Other objects not explicitly mentioned can be derived from the context of the present invention, for example from the Description or from the Examples.

Achievement of Object

The expressions light guide plate and apparatus for the transport of light are used synonymously below and denote the same apparatus composed of the components colourless transparent sheet, reflector film and, situated between these, a thermoplastic applied by printing. This is not to be confused with the term sheet or colourless transparent sheet which defines exclusively the first light-guide-plate constituent that is produced by way of example by extrusion. Alternatively, the sheets can also be produced by way of a continuous casting process (continuous cast). The expressions printed thermoplastic, interruptive site and print effect are also used synonymously with one another below.

The wording "optical contact" below means chemical bonding or physical adhesion between two layers or interfaces. The wording "optical contact" expressly excludes any simple superposition of one layer, in particular of the reflector film, on another layer, in particular the colourless, transparent sheet.

The objects have been achieved by provision of a novel light guide plate which comprises a colourless transparent sheet and an opaque white or translucent white, thermoplastic reflector film. According to the invention, between the colourless transparent sheet and the reflector film there is a reactive adhesive, in particular a reactive hot-melt, or a colourless thermoplastic applied by structured printing. The glass transition temperature of the said thermoplastic is above 25° C. and below the glass transition temperatures of the material of the colourless transparent sheet and of the thermoplastic of the reflector film. A feature of a reactive adhesive alternatively used is that this hardens at a temperature above 25° C. and below the glass transition temperatures of the material of the colourless transparent sheet and of the thermoplastic of the reflector film.

Opaque materials are those that transmit from 0 to 10% of the light and correspondingly reflect a large proportion of the light. Materials defined as translucent are those that provide diffuse transmission of from 10 to 70% of the light.

A particular feature of the light guide plate of the invention is that there is no direct optical contact between the colourless transparent sheet and the reflector film. As already defined above, the expression no direct optical contact here means that there can certainly be superposition of some parts of, although not the entire area of, the reflector film of the colourless transparent sheet.

Surprisingly, when this type of light guide plate is used it is possible to omit any additional layer for reflection or, to use a different description, any additional lamination film for the protection of the interruptive sites, since in this structure the reflector film serves as protection for the thermoplastics applied by printing and used as structures for light emission and, at the same time, for reflection of the light. Another advantage of the light guide plate of the invention is that the print effect using the thermoplastic has protection not only from abrasion but also from exterior effects such as moisture or chemicals or effects of weathering. In particular, the light guide plate of the invention has the great advantage over the prior art that the emission of the light is coupled with the reflector function in a modified layer.

The colourless transparent sheet in the light guide plate of the invention is preferably composed of polycarbonate, of a cycloolefin copolymer, of polystyrene, of PMMA or of a copolymer of MMA and styrene. It is particularly preferable that the colourless transparent sheet is composed of PMMA or of a copolymer of MMA and styrene, and it is very particularly preferable that it is composed of PMMA. According to the invention, the expression PMMA does not necessarily mean that the material comprises simply a polymer of MMA. Many commercially obtainable PMMAs, often termed acrylic sheet, comprise a certain proportion of comonomers, e.g. alkyl acrylates, in order inter alia to improve thermal stability.

Alternatively, the colourless transparent sheet is composed of a blend which comprises at least 50% by weight of PMMA. A factor which requires attention here during the selection of the other blend constituents and which can easily be determined by the person skilled in the art is that the compatibility of these with the PMMA is such as not to disrupt transparency.

The thickness of the colourless transparent sheet is preferably from 0.25 mm to 25 mm, preferably from 1 mm to 10 mm and particularly preferably from 1.5 mm to 4 mm. An example of the PMMA preferably used is the PMMA obtainable commercially with trade mark PLEXIGLAS® from Evonik Röhm GmbH & Co. KG.

The reflector films can be composed of almost any desired thermoplastic material. By way of example, the films are composed of poly(meth)acrylate. In this context, poly(meth)acrylate means homo- or copolymers of methacrylates and/or of acrylates. It is preferable that the reflector films used according to the invention are composed of a polyester. It is particularly preferable that the materials here comprise a film made of PET. The thickness of the reflector films is preferably from 25 to 500 µm and particularly preferably from 50 µm to 200 µm. In another, likewise particularly preferred, embodiment the reflector film comprises a three-layer film with a middle layer made of semicrystalline polypropylene (PP) comprising particles and with two exterior layers made of cycloolefin copolymers. In this case, the particles in particular comprise $TiO_2$, $BaSO_4$ or $CaCO_3$. Three-layer films of this type are marketed by way of example by Mitsubishi Plastics as Lumirex II M20 or L20.

The reflector films are moreover white opaque films or at least translucent white films. Embodiments using a transparent film, which in this case would actually merely be a protective film, are not according to the invention, since systems of that type would lack the advantage that no additional layer is incorporated for reflection. A consequence of a translucent film is that a certain proportion of the emitted light is also emitted at that side of the panel that comprises the said film. It is thus possible to produce illumination panels which by way of example in addition to direct illumination also, in accordance with the light transmittance of the film, emit a defined quantity of light in the opposite direction, in order by way of example to provide indirect illumination by way of the ceiling. The white colouring can be achieved by adding fillers known to the person skilled in the art, independently of the extent of the colouring relating to an opaque or translucent system. Examples of these fillers are $TiO_2$, silicon dioxide and barium sulphate. Commercially obtainable examples of white-coloured reflector films made of PET are Melinex 339 from Dupont Tejin and Hostaphan WO50 from Mitsubishi Rayon.

The thermoplastic which is applied by printing and which in the finished light guide plate assumes the function of interruptive sites for the refraction and emission of the light on the visible side of the light guide plate can be based on any thermoplastic material which has a glass transition temperature above 25° C. and below the softening points of the reflector film and of the colourless transparent sheet; the temperatures involved here can be glass transition temperatures or melting points. If a thermally activated adhesive (reactive hot-melt) is used, the thermal activation must likewise occur above 25° C. and below the melting point of film and light guide plate. Another factor that must be considered by the person skilled in the art during selection is that the thermoplastic or reactive adhesive is not restricted by the respective printing process. The refractive index of the reactive adhesive or thermoplastic applied by printing can in principle be smaller than, the same as or greater than the refractive index of the colourless transparent sheet. However, it is preferable that the refractive index is the same as or greater than the refractive index of the material of the sheet comprising PMMA, since the efficiency of light emission is thus increased.

In an alternative, but in no way essential, embodiment of the present invention, the thermoplastic applied by printing can additionally comprise scattering particles. The scattering particles influence the light scattering in the thermoplastic applied by printing, and the person skilled in the art can therefore easily obtain maximum uniformity of light emission by balancing the following parameters: size of the interruptive sites, distribution of the interruptive sites, refractive index of the thermoplastic of the interruptive sites as a ratio to the refractive index of the material of the colourless transparent sheet, composition of the reflector film and finally nature, size and amount of optional scattering particles.

The scattering particles can comprise either organic or inorganic scattering particles. The decisive factor is that the size and the refractive index of the particles are such that visible light is scattered. Organic particles can by way of example comprise PMMA suspension polymers. Inorganic scattering particles generally comprise particles made of titanium dioxide, silicon dioxide or barium sulphate. The person skilled in the art is aware of all of these scattering particles and can easily select therefrom.

The thermoplastic of the interruptive sites applied by printing mostly takes the form of round, rectangular, strip-shaped, hexagonal or square structures. The printed image generally corresponds to a typical structure which comprises points or other features and is of the type typically found on light guide plates for BLUs and on light panels. It is preferable here that the print effect is one where the number and/or size of the interruptive sites increases with the distance from the edges through which the light is input. In the case of a light guide plate into which the light is input from the left-hand side, the largest and/or the most, structures are therefore to be found on the right-hand edge. Correspondingly, in the case of a light guide plate into which the light is input from all four edges, the largest, and/or the most, structures are found in the middle of the light guide plate.

The sizes of the structures of the interruptive sites in the two dimensions parallel to the light guide plate correspond to the sizes that are known to the person skilled in the art in systems of this type. The thickness of the structures between the colourless transparent sheet and the reflector film, and therefore the size of the structures in the third dimension that is perpendicular to the colourless transparent sheet, is from 0.5 to 200 μm, preferably from 1 to 30 μm. This thickness ideally therefore also corresponds to the distance of the reflector film from the colourless transparent sheet in the light guide plate.

The edges of the light guide plate of the invention are illuminated by means of light source(s) and therefore assume the function of a light input area. The light here can be input into the light guide plate by way of one, two, three or indeed all four, edges. The light is in turn emitted by way of at least one of the two surfaces which are the light-emission areas and are perpendicular to the edges. The term light-emission area here characterizes an area that is suitable for emission of light in the light guide body. The light input area is in turn capable of accepting light into the light guide plate in such a way that the light-guiding layer can distribute the input light across the entire light-emission area.

In the event that light is emitted only by way of one light-emission area, the reflector film is preferably a white opaque film. In the event that some of this light is also intended to be emitted on the reverse side of the reflector film, this must be a translucent white film and must have correspondingly high light transmittance.

In embodiments where the light is not input by way of all four edges or is input only by way of parts of edges, it is preferable that a reflective layer has been provided to all or part of the edges through which no light is input. The said reflective layer can comprise a film corresponding to the reflector film or else can also comprise a white-opaque-coloured coating material.

A second important aspect of the present invention is the process for the production of light guide plates with a thickness between 0.25 mm and 25 mm, preferably between 1 mm and 8 mm, particularly preferably between 1.5 mm and 4 mm. In this novel process, extrusion with a polishing stack is used in a first step to produce a sheet from a colourless transparent material. In a second step, carried out in-line, an opaque white or translucent white, thermoplastic reflector film printed with a colourless thermoplastic is laminated onto the said sheet. It is preferable that, in a concluding process, the sheet is sawn in-line into pieces, or is cut or is wound onto a roll. If the material is rolled up onto a roll, the dimensioning of the roll here must be such that the finished light guide plate is not subjected to any excessively large stresses during roll-up.

Another feature of the process according to the invention is that the location of the print effect after the lamination process is between the sheet and the reflector film, and optical contact between sheet and reflector film is thus provided, and that there is no direct optical contact between colourless transparent sheet and reflector film, and the glass transition temperature of the printed thermoplastic is above 25° C. and below the glass transition temperatures of the colourless transparent material of the sheet and of the thermoplastic of the reflector film. In order to permit exact positioning of the saw used for cutting-to-size, it is also possible to print differently coloured positional markings preferably on the reverse side of the reflector film, in addition to the white or colourless emission structures.

The process of the invention can be carried out with markedly more efficiency in terms of time and cost than processes of the prior art, and additionally provides protection for the print effect. This is achieved in that the optical interruptive sites are first printed onto the reflector film. The reflector film with the printed pattern is then laminated over the entire area onto the sheet in such a way that the location of the optical interruptive sites, which take the form of a spacer, is between colourless transparent sheet and reflector film. The print onto the reflector film is preferably achieved by means of a conventional film-printing process. In particular, the print effect is applied by using a low-cost mass-production printing process such as intaglio roll printing. The printing can take place off-line in a separate process, e.g. as integral constituent of the film-extrusion process. Alternatively, however, it is also possible that the printing of the reflector film takes place on-line, prior to the lamination onto the colourless transparent sheet.

In an alternative to the extrusion process that is described and preferred, the colourless transparent sheets are produced by means of a (continuous) casting process, and initially take the form of a continuous web of polymer.

In contrast to the process described in DE 10 2009 027288 A1, the bonding to the printed film takes place only after the polishing stack. There is generally no need for any adhesive or adhesion promoter during the lamination process, since the temperature of the surface of the colourless transparent sheet and/or of the printed reflector film during the lamination process is above the glass transition temperature or melting point of the printed thermoplastic of the interruptive sites, the said temperature being as far as possible below the glass transition temperatures or melting points of the colourless transparent sheet and of the reflector film.

During the lamination process, i.e. directly after the printed reflector film has been superposed onto the colourless transparent sheet with the print effect between the said two layers, the said layers are passed through rolls in such a way that the printed thermoplastic adheres on the colourless transparent sheet. Temperature, Shore hardness of the rubber roll and roll pressure here must be selected in such a way that no lasting direct optical contact occurs between the unprinted sites of the reflector film and the colourless transparent sheet. It is preferable here that the reflector-film side faces towards the carrier roll, which in particular comprises a rubber roll.

According to the invention there are two equally preferred embodiments in relation to the lamination process. In the first embodiment, the lamination takes place at a juncture at which the melt strand has already cooled to give the colourless transparent sheet to the extent that the surface temperature is below the glass transition temperature of the printed thermoplastic. In this variant directly prior to the lamination process the surface of the sheet comprising PMMA is heated by means of a radiant heater, of an IR source or of a blower to a temperature above the glass transition temperature of the printed thermoplastic before, as described, a roll, in particular a rubber roll, is used to press the printed reflector film onto the surface of the sheet.

In the second embodiment of the invention, at least one roll, preferably a rubber roll, is used to laminate the printed reflector film onto the colourless transparent sheet directly after the polishing stack. In this case, the lamination unit is to be installed in the vicinity of the polishing stack in such a way that the surface of the colourless transparent sheet has on the one hand undergone sufficient cooling and at the same time its temperature is still above the glass transition temperature or melting point of the thermoplastic applied by printing.

The cooled laminate made of colourless transparent sheet, print effect and reflector film can, after cooling, be cut to size or wound up onto a roll and can undergo further finishing processes. A further finishing process can by way of example comprise polishing of the edges or as already described equipping of the edges with a reflective coating material or with a reflective film or with an adhesive tape.

This novel in-line lamination process and a light guide plate produced thereby combine the advantages of low operating cost in the production of the structures by an in-line process, but without the disadvantages of high capital expenditure and high maintenance costs. In this process moreover a change of the structure is substantially easier to carry out, in fewer steps than in the case of structuring by way of rolls, since structure change can be carried out while the process of production of the laminate is running, for example simply by changing the reflector film. In particular, the roll-to-roll print onto a flexible film can be achieved very rapidly and at low cost by familiar film-printing methods.

Prior to or during installation into an eventual device, the edges are equipped with one or more illumination units by analogy with the prior art. The light sources can have reflectors in order to improve irradiation of the light guide body. The said light sources preferably comprise LEDs.

Surprisingly, the light guide plates of the invention have the additional technical advantage of emitting the light with a uniform intensity distribution between 0 and 60°. When a light guide plate of the invention is used, the only remaining requirement for a scattering film or scattering sheet is for protection of the light guide plate from dust or scratching and to achieve an additional increase in the perceived uniformity of the light provided. However, the amounts of scattering particles that must be present in the said scattering films or scattering sheets in order to achieve this are then very small in comparison with the prior art. Alternatively it is actually possible to achieve the perceived effect by using, on the side facing the observer, a scattering film or scattering sheet that has been surface-treated, and the said surface treatment can be achieved during the extrusion process, by way of example by means of a structured or rubberized roll. In this last embodiment it is then possible to use the scattering films or scattering sheets with no scattering particles at all. The light guide plates according to the present invention therefore have the additional great advantage that the use of these additionally increases the light yield, e.g. in LED-based lighting systems.

The light guide plates of the invention or the apparatuses produced therewith for the transport of light are preferably used as backlighting in LCD display screens. They can moreover be used as light panels or as backlighting in signs or in advertising panels. In the case of backlighting of an LCD display screen, it is preferable that scattering films and light-deflecting films are also superposed on the illumination side of the light guide plate. In the case of light panels it is usual to mount a diffusely scattering sheet or film or a microstructured film in front of the illumination side, in order to achieve a specific effect on the emission properties of the light panel. In the case of signs or advertising panels it is usual to mount a coloured transparent or translucent film onto the illumination side of the light guide plate. This is then backlit by the light panel.

REFERENCE SIGNS IN THE DRAWINGS

Figure 1:
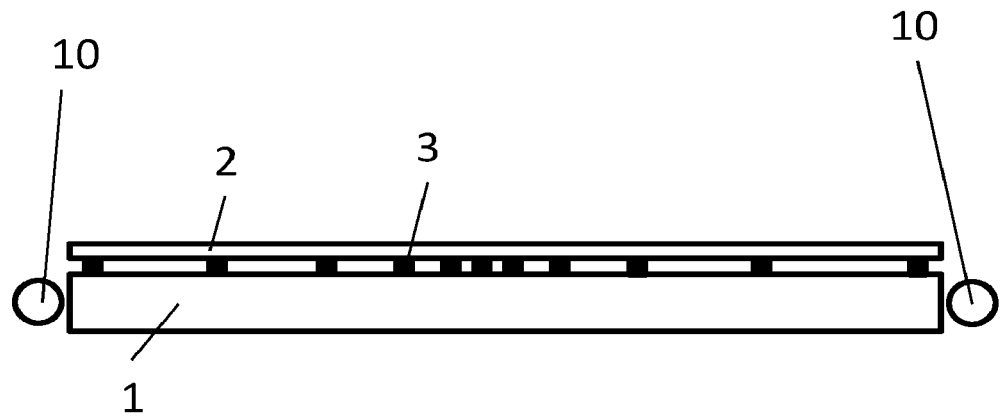
FIG. 1 depicts by way of example a light guide plate of the invention and two light sources for light input.
Figure 2:
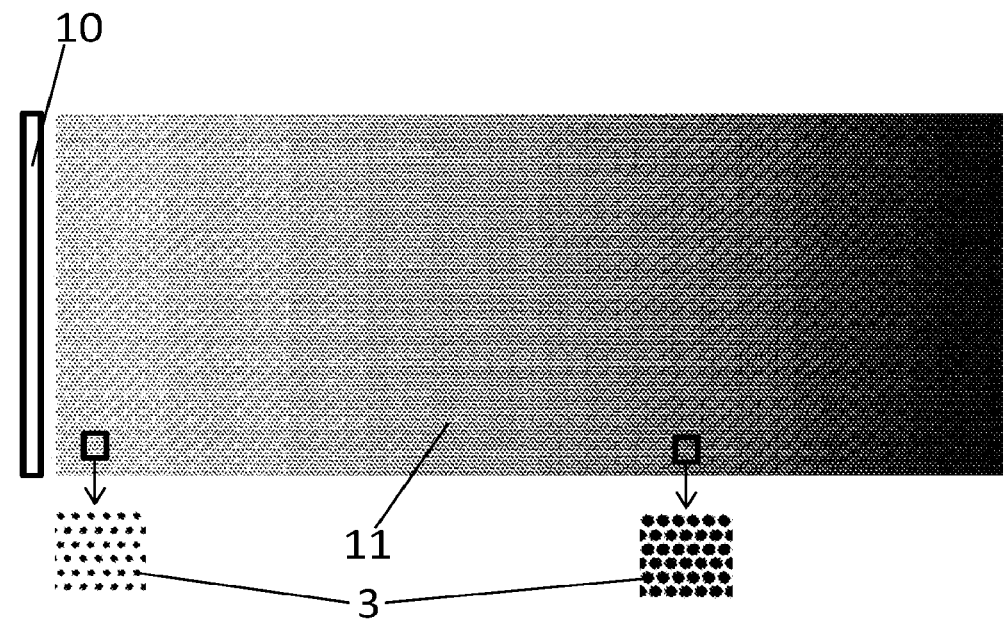
FIG. 2 illustrates the density of the thermoplastics or reactive adhesives applied by printing, which increases with increasing distance from the light source. In this case the density increase is achieved by enlarging the structures while the relative number remains the same.
Figure 3:
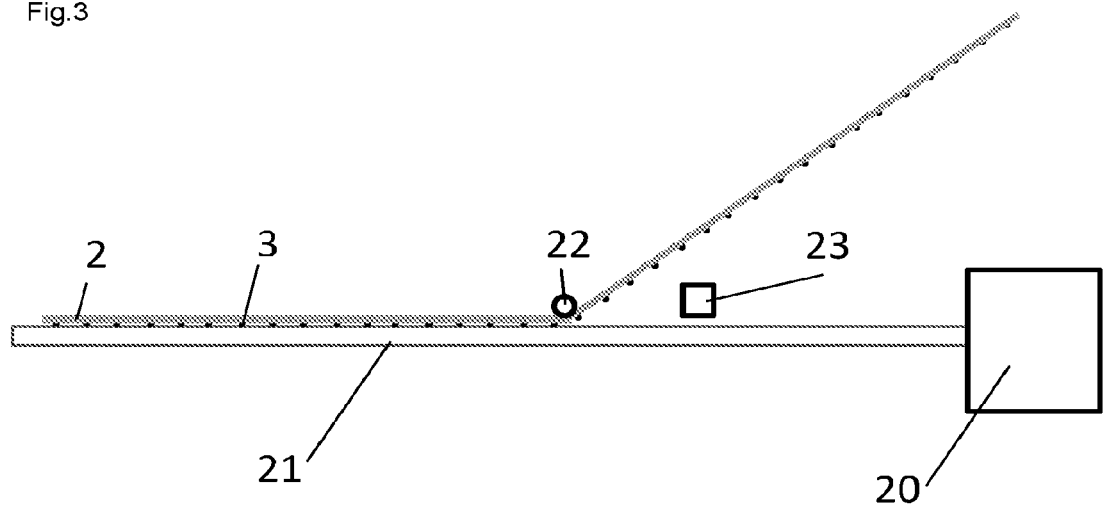
FIG. 3 is a diagram of a possible production process for the light guide plates of the invention. In this case, the structures applied by printing to the reflector film are heated according to the invention, and a roll is used to press these onto the transparent sheet.

The following reference signs have been used in the drawings:
1 Colourless transparent sheet
2 Reflector film
3 Reactive adhesive or thermoplastic applied by printing
10 Light source
11 Printed pattern
20 Extruder with polishing stack
21 Colourless, transparent sheet web from polishing stack
22 Pressure roll
23 Heating device, e.g. radiant heater, IR source or blower

The invention claimed is:

1. A process for producing a light guide plate, comprising:
producing a colorless transparent sheet from a colorless transparent material by extrusion with a polishing stack;
laminating in-line a printed reflector film to the colorless transparent sheet, the printed reflector film comprising: a thermoplastic reflector film which is opaque white or translucent white and made of a thermoplastic material; and a colorless thermoplastic printed on the thermoplastic reflector film;
in a concluding in-line process, sawing the colorless transparent sheet into pieces, or cutting or winding the colorless transparent sheet onto a roll,
wherein:
a location of a print effect after the laminating is between the colorless transparent sheet and the thermoplastic reflector film;
there is no direct optical contact between the colorless transparent sheet and the thermoplastic reflector film; and
a glass transition temperature of the printed colorless thermoplastic is above 25° C. and below glass transition temperatures of the colorless transparent material of the colorless transparent sheet and of the thermoplastic material of the thermoplastic reflector film.

2. The process of claim 1, wherein, immediately prior to the laminating, a surface of the colorless transparent sheet comprising PMMA is heated by a radiant heater, an IR source or a blower to a temperature above the glass transition temperature of the printed colorless thermoplastic, and at least one roll is used to press the printed reflector film onto the surface of the colorless transparent sheet.

3. The process of claim 1, wherein at least one roll is used to laminate the printed reflector film onto the colorless transparent sheet directly after the polishing stack.

4. An LCD display screen comprising the light guide plate produced by the method of claim 1.

5. A sign or advertising panel comprising the light guide plate produced by the method of claim 1.

6. The process of claim 1, wherein the colorless transparent sheet comprises polycarbonate, a cycloolefin copolymer, PMMA, a copolymer of MMA and styrene, or a blend comprising at least 50% by weight of PMMA.

7. The process of claim 1, wherein a thickness of the light guide plate is from 1.5 to 4 mm.

8. The process of claim 1, wherein the thermoplastic reflector film comprises a film comprising opaque white PET or a three-layer film with a semicrystalline middle layer comprising polypropylene comprising particles and with two exterior layers comprising a cycloolefin copolymer.

9. The process of claim 1, wherein a refractive index of the colorless thermoplastic applied by printing is the same as or greater than a refractive index of the colorless transparent material of the colorless transparent sheet.

10. The process of claim 1, wherein the colorless thermoplastic applied by printing further comprises scattering particles.

11. The process of claim 1, wherein a thickness of the thermoplastic reflector film is from 25 to 500 μm.

12. The process of claim 1, wherein the colorless thermoplastic applied by printing has been applied by printing round, rectangular, strip-shaped, hexagonal or square structures, where the number and/or size of the structures increases with a distance from edges through which the light is input.

13. The process of claim 1, wherein a thickness, between the colorless transparent sheet and the thermoplastic reflector film, of the colorless thermoplastic applied by printing is from 0.5 to 200 μm.

14. The process of claim 1, wherein edges through which no light is input are equipped entirely or to some extent with a reflective layer.

* * * * *